(12) United States Patent
Magdassi et al.

(10) Patent No.: US 9,574,092 B2
(45) Date of Patent: Feb. 21, 2017

(54) SOLAR-RADIATION-ABSORBING FORMULATIONS AND RELATED APPARATUS AND METHODS

(75) Inventors: Shlomo Magdassi, Jerusalem (IL);
Daniel Mandler, Jerusalem (IL);
Mubeen Baidossi, Kefar Qara (IL);
Rachel Assa, Moshav Ginaton (IL);
Ophir Chernin, Beit Shemesh (IL);
Yaniv Binyamin, Tzur Hadassah (IL)

(73) Assignee: BrightSource Industries (Israel), Ltd., Jerusalem (IL)

( * ) Notice: Subject to any disclaimer, the term of this patent is extended or adjusted under 35 U.S.C. 154(b) by 786 days.

(21) Appl. No.: 14/112,052

(22) PCT Filed: Apr. 17, 2012

(86) PCT No.: PCT/US2012/033878
§ 371 (c)(1),
(2), (4) Date: Jan. 24, 2014

(87) PCT Pub. No.: WO2012/145283
PCT Pub. Date: Oct. 26, 2012

(65) Prior Publication Data
US 2014/0141236 A1 May 22, 2014

Related U.S. Application Data

(60) Provisional application No. 61/476,301, filed on Apr. 17, 2011.

(51) Int. Cl.
| | |
|---|---|
| C09D 5/32 | (2006.01) |
| C09D 183/16 | (2006.01) |
| F24J 2/48 | (2006.01) |
| C09D 7/12 | (2006.01) |
| B05D 3/00 | (2006.01) |
| F24J 2/07 | (2006.01) |

(52) U.S. Cl.
CPC .............. *C09D 5/32* (2013.01); *B05D 3/002* (2013.01); *C09D 7/1216* (2013.01); *F24J 2/485* (2013.01); *F24J 2/07* (2013.01); *Y02E 10/40* (2013.01); *Y10T 428/26* (2015.01); *Y10T 428/31612* (2015.04)

(58) Field of Classification Search
CPC .............. C09D 5/32; F24J 2/485; B05D 3/002
See application file for complete search history.

(56) References Cited

U.S. PATENT DOCUMENTS

| | | | |
|---|---|---|---|
| 3,755,223 A * | 8/1973 | Engel | ...................... C08L 63/00 244/1 R |
| 4,224,355 A | 9/1980 | Lampkin et al. | |
| 4,278,829 A | 7/1981 | Powell | |
| 4,300,532 A | 11/1981 | Olsen | |
| 4,530,722 A | 7/1985 | Moore et al. | |
| 4,849,298 A | 7/1989 | Raevsky | |
| 5,154,769 A | 10/1992 | Kuske et al. | |
| 5,196,228 A * | 3/1993 | Kirby | ................... C09D 183/04 427/226 |
| 5,250,112 A | 10/1993 | Wussow et al. | |
| 5,409,777 A | 4/1995 | Kennedy et al. | |
| 5,814,434 A | 9/1998 | Nakamura et al. | |
| 6,632,529 B1 | 10/2003 | Clough | |
| 2002/0047058 A1 | 4/2002 | Verhoff et al. | |
| 2003/0035917 A1 | 2/2003 | Hyman | |
| 2004/0011252 A1 | 1/2004 | Sturgill et al. | |
| 2005/0107870 A1 | 5/2005 | Wang et al. | |
| 2006/0011490 A1 * | 1/2006 | Nguyen | .................... C25C 3/08 205/372 |
| 2006/0052233 A1 | 3/2006 | Beeckman et al. | |
| 2006/0249705 A1 | 11/2006 | Wang et al. | |
| 2007/0027241 A1 | 2/2007 | Akamatsu | |
| 2007/0149673 A1 | 6/2007 | Sturgill et al. | |
| 2008/0038561 A1 | 2/2008 | Yoshizawa et al. | |
| 2009/0162651 A1 | 6/2009 | Rios et al. | |
| 2010/0139749 A1 | 6/2010 | Mapel | |
| 2010/0139818 A1 | 6/2010 | Ishii et al. | |
| 2010/0167033 A1 | 7/2010 | Poppe et al. | |
| 2010/0218822 A1 | 9/2010 | Yamasaki et al. | |
| 2010/0239871 A1 | 9/2010 | Scheffer et al. | |
| 2011/0017097 A1 | 1/2011 | Ruckebusch et al. | |

OTHER PUBLICATIONS

International Search Report and Written Opinion for International Application No. PCT/US12/33878.
Office Action issued Apr. 28, 2015, in Chinese Application No. 201280001921.9.

* cited by examiner

*Primary Examiner* — Charles Boyer
(74) *Attorney, Agent, or Firm* — Potomac Law Group, PLLC; Mark Catan

(57) ABSTRACT

Paint formulations having a high absorptivity with respect to solar radiation are disclosed herein. The disclosed paint formulations are also thermally and mechanically durable, thereby enabling the paint formulations to be used on components in solar thermal applications where exposure to high temperatures and environmental conditions may be an issue. The paint formulation can include an oxide-based pigment, an organic binder, one or more additives, an inorganic filler, and/or an organic solvent. The pigment can have a relatively high absorptivity with respect to light having a wavelength in the range from 250 nm to 3000 nm. Curing of the paint formulation can irreversibly convert the organic binder into an inorganic binder.

18 Claims, 3 Drawing Sheets

SOLAR-RADIATION-ABSORBING FORMULATIONS AND RELATED APPARATUS AND METHODS

The present application is a U.S. national stage entry of International Application No. PCT/US12/33878, filed Apr. 17, 2012, which claims the benefit of U.S. Provisional Application No. 61/476,301, filed April 17, 2011, both of which are hereby incorporated by reference herein in their entirety.

FIELD

The present disclosure relates generally to formulations for paint, and, more particularly, to solar-radiation-absorbing formulations for use in components of a solar tower system.

SUMMARY

Paint formulations having a high absorptivity with respect to solar radiation are disclosed herein. The disclosed paint formulations are also thermally and mechanically durable, thereby enabling the paint formulations to be used on components in solar thermal applications where exposure to high temperatures and environmental conditions may be an issue. The paint formulation can include an oxide-based pigment, an organic binder, one or more additives, an inorganic filler, and/or an organic solvent. The pigment can have a relatively high absorptivity with respect to light having a wavelength in the range from 250 nm to 3000 nm. Curing of the paint formulation can irreversibly convert the organic binder into an inorganic binder.

In embodiments, a paint formulation can include an oxide-based pigment, an organic binder, a boron-based glass additive, an inorganic filler, and an organic solvent. The oxide-based pigment can be at a concentration between 5% (wt/wt) and 30% (wt/wt) and can include at least one selected from a manganese ferrite black spinel, a chromium cobalt iron black spinel, a copper chromite black spinel, and a nickel iron chromite black spinel. The organic binder can be at a concentration between 10% (wt/wt) and 80% (wt/wt) and can include at least one selected from a methyl polysiloxane, a phenyl polysiloxane, a phenylmethyl silicone resin, and an emulsion of a phenylmethyl polysiloxane resin. The glass additive can be at a concentration between 1% (wt/wt) and 20% (wt/wt) and can include at least one selected from boric acid, boron oxide, metal borides, and boron salts. The inorganic filler can include at least one selected from mica, talc, and clay. The organic solvent can be at a concentration between 10% (wt/wt) and 60% (wt/wt) and can include at least one selected from a glycol ether, an aromatic naphtha solvent, butyl acetate, toluene, and a member of the xylene family. The additive can be in the form of particles having a size between 80 μm and 140 μm. The inorganic filler can be in the form of particles having a size less than 30 μm. The oxide-based pigment and/or the paint formulation can have an absorptivity of at least 70% with respect to light having a wavelength in the range from 250 nm to 3000 nm.

In embodiments, a method of painting a metal surface can include electrostatic spraying the paint formulation over the metal surface. The paint formulation can include an oxide-based pigment, an organic binder, a boron-based glass additive, an inorganic filler, and an organic solvent. The oxide-based pigment can be at a concentration between 5% (wt/wt) and 30% (wt/wt) and can include at least one selected from a manganese ferrite black spinel, a chromium cobalt iron black spinel, a copper chromite black spinel, and a nickel iron chromite black spinel. The organic binder can be at a concentration between 10% (wt/wt) and 80% (wt/wt) and can include at least one selected from a methyl polysiloxane, a phenyl polysiloxane, a phenylmethyl silicone resin, and an emulsion of a phenylmethyl polysiloxane resin. The glass additive can be at a concentration between 1% (wt/wt) and 20% (wt/wt) and can include at least one selected from boric acid, boron oxide, metal borides, and boron salts. The inorganic filler can include at least one selected from mica, talc, and clay. The organic solvent can be at a concentration between 10% (wt/wt) and 60% (wt/wt) and can include at least one selected from a glycol ether, an aromatic naphtha solvent, butyl acetate, toluene, and a member of the xylene family. The method can further include, after the applying, curing the paint formulation at temperature greater than 200° C. such that the organic binder irreversibly converts to an inorganic binder. After the curing, the oxide-based pigment and/or the paint formulation can have an absorptivity of at least 70% with respect to light having a wavelength in the range from 250 nm to 3000 nm.

In embodiments, a paint formulation can include an oxide-based pigment, an organic binder, a boron-based glass additive, and an inorganic filler. The organic binder can be irreversibly converted to an inorganic binder upon curing of the paint formulation at a temperature greater than 200° C. The oxide-based pigment and/or the paint formulation can have an absorptivity of at least 70% with respect to light having a wavelength in the range from 250 nm to 3000 nm.

In embodiments, a painted metal article can include a metal layer and a paint layer. The metal layer can include steel, alloy steel, or a superalloy. The paint layer can be provided over a surface of the metal layer. The paint layer can include an oxide-based pigment, an inorganic binder, a boron-based glass additive, and an inorganic filler. The paint layer and/or the oxide-based pigment can have an absorptivity of at least 70% with respect to light having a wavelength in the range from 250 nm to 3000 nm. The inorganic binder can be of the type that is an organic binder prior to curing of the paint layer, which curing irreversibly converts the organic binder into the inorganic binder.

In embodiments, a method of painting a metal article can include applying over an exterior surface of the metal article a paint formulation. The paint formulation can include an oxide-based pigment, an organic binder, a boron-based glass additive, and an inorganic filler. The method can further include, after the applying, curing the paint formulation at temperature greater than 200° C. such that the organic binder irreversibly converts to an inorganic binder. After the curing, the oxide-based pigment and/or the paint formulation can have an absorptivity of at least 70% with respect to light having a wavelength in the range from 250 nm to 3000 nm.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

DETAILED DESCRIPTION

Figure 1A:
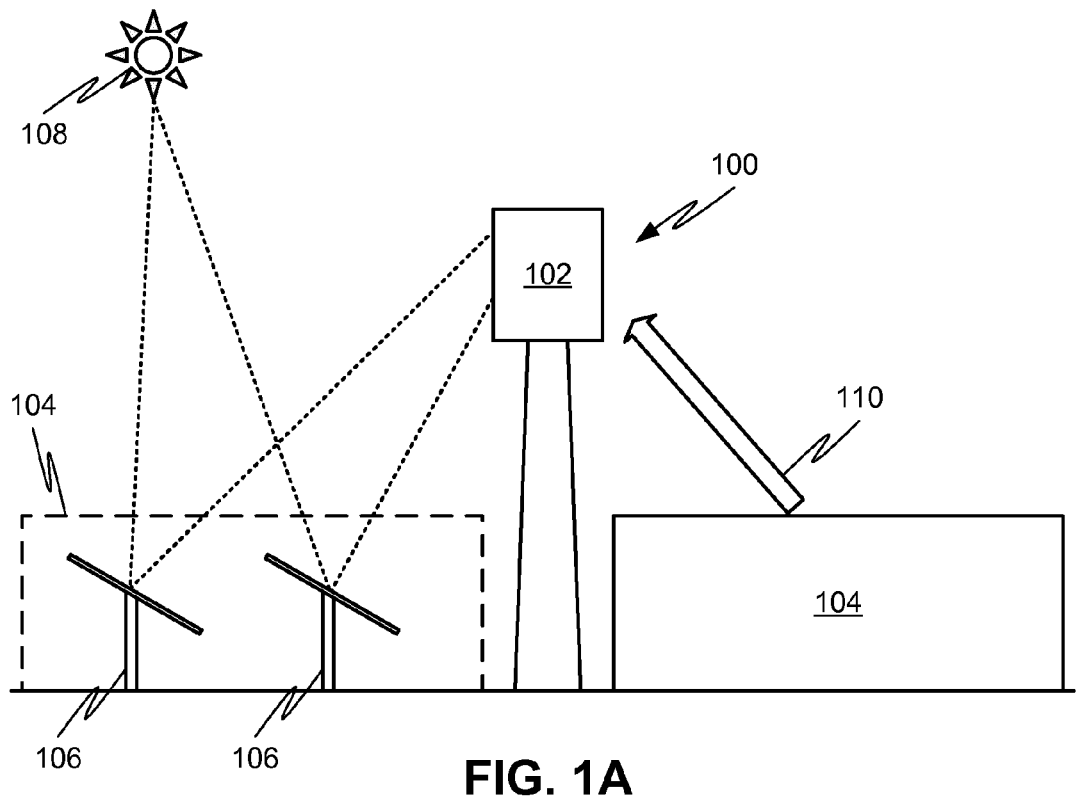
FIG. 1A is a simplified diagram illustrating an elevation view of a solar thermal system with a single solar tower, according to embodiments of the disclosed subject matter.

Insolation can be used by a solar thermal system to generate solar steam and/or for heating a fluid, such as a molten salt or a gas, which may subsequently be used in the production of electricity. Referring to FIG. 1A, a solar thermal system employing a single solar tower is shown. The system can include a solar tower 100, which has a target 102 that receives reflected insolation 110 from a solar field 104, which at least partially surrounds the solar tower 100. The solar tower 100 can have a height of, for example, at least 25 m. The target 102 can be a solar energy receiver system, which can include, for example, an insolation receiving surface of one or more solar receivers configured to transmit heat energy of the insolation to a working fluid or heat transfer fluid flowing therethrough. The target 102 may include one or more separates solar receivers (e.g., an evaporating solar receiver and a superheating solar receiver) arranged at the same or different heights or positions. The solar field 104 can include a plurality of heliostats 106, each of which is configured to direct insolation at the target 102 in the solar tower 100. Heliostats 106 within the solar field can adjust their orientation to track the sun 108 as it moves across the sky, thereby continuing to reflect insolation onto one or more aiming points associated with the target 102. The solar field 104 can include, for example, over 50,000 heliostats deployed in over an area of approximately 4 km².

Figure 1B:
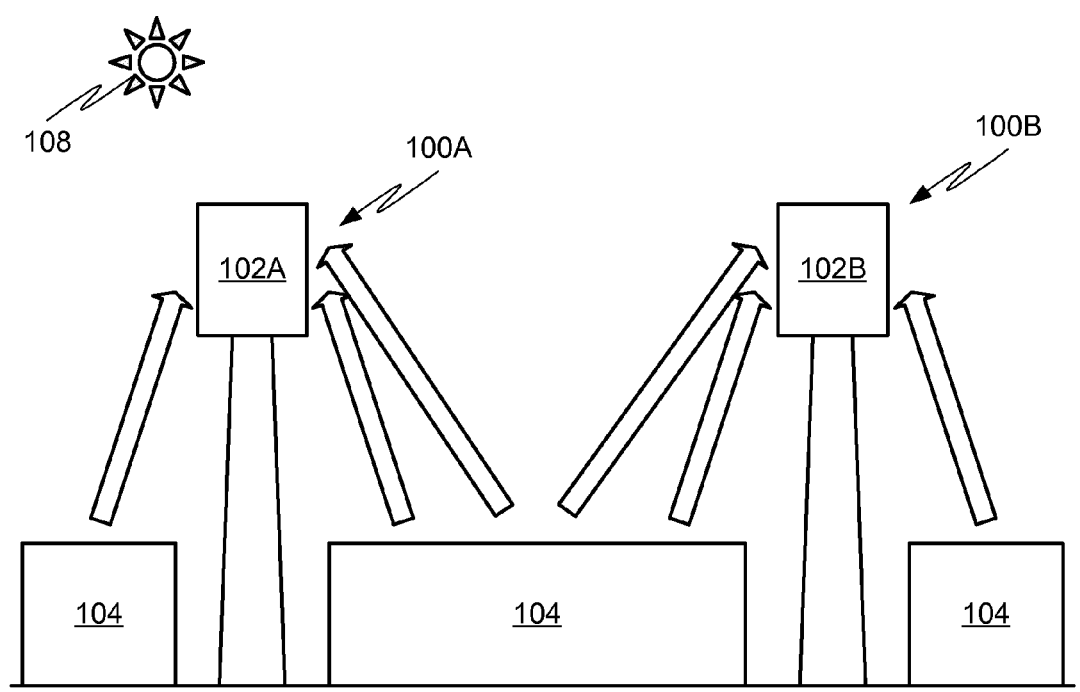
FIG. 1B is a simplified diagram illustrating an elevation view of a solar thermal system with multiple solar towers, according to embodiments of the disclosed subject matter.

FIG. 1B shows a "multi-tower" version of a solar thermal system. Each tower can have a respective target, which may include one or more solar receivers. The first solar tower 100A has a target 102A thereon and is at least partially surrounded by solar field 104 for receiving reflected insolation therefrom. Similarly, a second solar tower 100B has a target 102B thereon and is at least partially surrounded by solar field 104 for receiving reflected insolation therefrom. For example, the solar receiver in one of the towers may be configured to produce steam from insolation (i.e., an evaporating solar receiver) while the solar receiver in another one of the towers may be configured to superheat the steam using insolation (i.e., a superheating solar receiver). In another example, one or more of the solar towers may have both an evaporating solar receiver and a superheating solar receiver. A limited number of components have been illustrated in FIGS. 1A-1B for clarity and discussion. It should be appreciated that actual embodiments of a solar thermal system can include, for example, optical elements, control systems, sensors, pipelines, generators, and/or turbines.

Figure 2A:
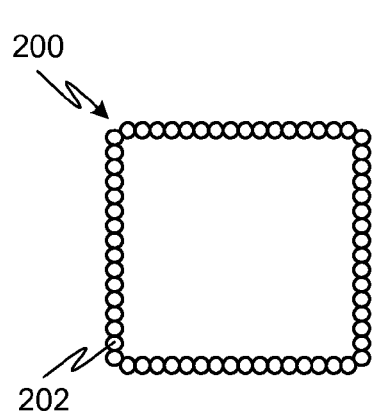
FIG. 2A is a simplified diagram illustrating a top view of pipes in a receiver of a solar tower, according to embodiments of the disclosed subject matter.
Figure 2B:
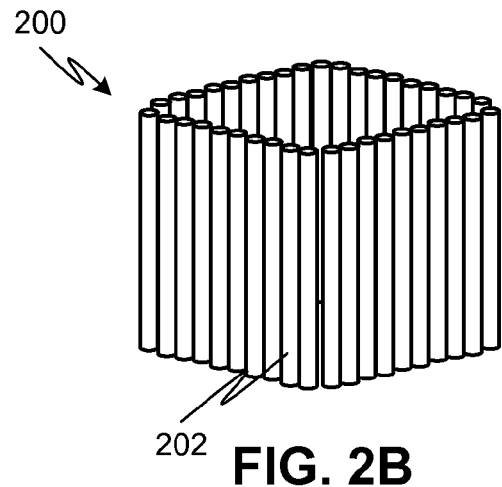
FIG. 2B is a simplified diagram illustrating an isometric view of the receiver pipes of FIG. 2A, according to embodiments of the disclosed subject matter.

The receiver in each solar tower can include one or more fluid conduits or pipes configured to convey a working fluid or heat transfer fluid at high temperatures and/or pressures. For example, the pipes can be configured to convey pressurized water and/or pressurized steam at temperatures in excess of 290° C. and pressures in excess of 160 bar. Referring to FIGS. 2A-2B, an exemplary configuration of a portion 200 of a solar receiver is shown. Pipes 202 of the receiver portion 200 can be arranged in a single row following a particular geometric configuration, for example, in the shape of a circle, hexagon, or rectangle (as shown in FIG. 2A), or in any other suitable configuration. At least a portion of the exterior surface of each pipe 202 can be arranged to receive insolation reflected by heliostats in the solar field onto the receiver. The solar insolation can heat pipes 202 and thereby heat the fluid therethrough for use in producing electricity or in other applications.

When pipes 202 are constructed from metal, the native surface of the metal may be at least partially reflective to the solar radiation, thereby reducing the efficiency by which heat energy of the insolation is transferred to the fluid flowing through the pipes 202. The metal pipes 202 can thus be treated or painted to maximize or at least improve the solar absorption of the pipes 202. However, high-temperature operation of the solar thermal system (for example, at temperatures in excess of 450° C.) and environmental exposure (for example, to a desert atmosphere where the solar thermal system is located) may adversely affect the outer layers of the metal surface of the pipes 202, including any paint formulation applied thereto.

Paint formulations according to one or more embodiments of the disclosed subject matter can exhibit one or more of the following features:

(1) the paint formulation (and/or a pigment component thereof) has an absorptivity with respect to solar radiation in the wavelength range from 250 nm to 3000 nm (AM 1.5) of greater than 70%, 80%, 90%, 95% or greater.

(2) the paint formulation applied to a metal article (e.g., carbon steel, alloy steel, galvanized steel, stainless steel, copper, aluminum, superalloy) has sufficient thermal durability (i.e., does not ablate over time) to withstand high temperatures (e.g., at least 450° C., 500° C., 550° C., 600° C., 650° C., or higher) over a sustained period of time (i.e., hundreds or thousands of consecutive hours under accelerated exposure conditions, for example, at least 1000 hours);

(3) the paint formulation applied to the metal article at a thickness less than or equal to 200 μm appears black;

(4) the paint formulation applied to a metal article at a thickness greater than or equal to 50 μm (or greater than 70 μm) does not peel from the article or exhibit cracking after curing;

(5) the paint formulation applied to a metal article at a thickness less than or equal to 200 μm is sufficient to protect the metal article from degradation due to exposure to the elements (for example, protecting the metal article during an acceleration test in an atmosphere of 85% relative humidity (RH) for a period of at least 200 hours, 250 hours, 300 hours or more, and/or an atmosphere of salt fog for a period of at least 24 hours, 48 hours, 72 hours, or more);

(6) the paint formulation applied to a metal article at a thickness less than or equal to 200 μm has sufficient mechanical durability to withstand one or more abrasion tests, for example, a taber abrasion test, such as ASTM D1044 (haze) or ASTM D4060 (weight-loss), and a falling sand test, such as ASTM D9868.

Such a high-temperature paint formulation for use in a solar thermal system can include (i) an oxide-based pigment (such as, but not limited to, a black pigment), (ii) an organic binder which irreversibly converts to an inorganic binder (e.g., a ceramic binder) after heating at a high temperature (e.g., at or above 200° C.), (iii) a glass modifying agent (e.g., a boron-based glass additive) that can enhance the mechanical and/or thermal stability of the formulation, and (iv) an inorganic filler (e.g., a silicate-based solid material that forms layered inorganic microstructures or other inorganic modifying agents).

For example, the paint formulation can be applied to the external surface (or at least a portion thereof) of a pipe assembly of one or more pipes. The paint coating can be provided at a thickness of 50 μm or less, or at least 50 μm, 70 μm, 100 μm or greater, or at most 500 μm, 300 μm, 200 μm or less. For example, the paint coating can have a total thickness between 50 μm and 200 μm. Alternatively or additionally, each layer of the paint coating can have a dry thickness less than 200 μm. The paint coating on the pipe assembly can have an inorganic (e.g., ceramic) binder that is produced by first applying the paint formulation over the external surface (i.e., applying the paint formulation either directly to the exterior surface of the metal or applying the paint formulation to an intermediate layer of material over the exterior surface of the metal) at a time when the binder is an organic binder, and subsequently heating the paint formulation (e.g., at a temperature greater than 200° C.) to cure the paint formulation on the pipe, thereby irreversibly converting the organic binder into an inorganic and/or ceramic binder.

The oxide-based pigment can be formulated such that it does not emit or reflect light in any part (or substantially all) of the visible portion of the electromagnetic spectrum and/or it absorbs all (or substantially all) of the wavelengths of light in the visible portion of the electromagnetic spectrum. The oxide-based pigment can include a spinel, for example, a manganese ferrite black spinel. For example, the pigment can be an inorganic pigment that is the reaction product of high temperature calcination in which manganese (II) oxide, manganese (III) oxide, iron (II) oxide, and/or iron (III) oxide in varying amounts are homogeneously and ionically inter-diffused to form a crystalline matrix of spinel. For example, the spinel can be a manganese ferrite black spinel (such as $Fe_xMn_yCuO$, known as Color Index (CI) Name Pigment Black 26 or CI No. 77494 and commercially available as Black 444, Black 10C931, or Black 30C933 from The Shepherd Color Company), chromium cobalt iron black spinel (such as $CuCr_2O_4$, known as CI Name Pigment Black 27 or CI No. 77502 and commercially available as HEUCODUR HD 955 from Heubach in Germany, or SICOPAL® Black K 0090 from BASF), a copper chromite black spinel (known as CI Name Pigment Black 28 or CI No. 77428 and commercially available as: Black CT1701 from Johnson Matthey; Black 20C980 or Black 30C965 from The Shepherd Color Company; HEUCODUR HD-9-100 from Heubach in Germany), and/or a nickel iron chromite black spinel (known as CI Name Pigment Black 30 or CI No. 77504, and commercially available as Black 376A from The Shepherd Color Company; Black-30 from Johnson Matthey; Black 950 from Heubach in Germany).

Alternatively or additionally, the oxide-based pigment can include one or more transition metal oxides having a high thermal resistance, such as, but not limited to chromium oxide ($Cr_2O_3$), cobalt oxide (CoO), copper oxide (CuO), ferrous oxide ($Fe_2O_3$), nickel oxide (NiO), and manganese oxide ($MnO_2$). Alternatively or additionally, the oxide-based pigment can be formed from metal precursors or from compounds that contain metallic elements. Upon firing of the metal precursor the organic constituent burns off and the metallic constituent oxidizes to form metal oxides.

The oxide-base pigment can be in the form of particles having a size less than 1 μm, for example, between 0.1 μm and 1 μm, and/or having an average size of less than 1 μm. The pigment in the paint formulation can be at a concentration of between about 5% (wt/wt) and about 20% (wt/wt). For example, the pigment can be at a concentration between about 5% (wt/wt) and about 12% (wt/wt). Other pigment particles that exhibit acceptable absorptivity with respect to solar radiation may also be used so long as such pigment has sufficient high temperature stability (i.e., for temperatures of 600° C. or above).

With respect to the organic binder, a heat resistant polymeric binder can be used. The organic binder can be formulated such that, after curing at high temperatures (e.g., firing at a temperature above 200° C., such as at 350° C.), the organic binder irreversibly converts to an inorganic binder, such as silica or glass. The organic binder can include, for example, at least one of silicone resins, silicone resin copolymers, silicone-polyester resin, and silicone-epoxy resins. For example, the organic binder can include a silicone resin selected from methyl polysiloxanes, phenyl polysiloxanes, phenylmethyl silicone resin (medium-hard, medium-hard high solid, or soft), and an emulsion of phenyl methyl polysiloxane resins. In a particular example, 50-80% (wt/wt) phenylmethyl polysiloxane resin (for example, 50-60% (wt/wt)) in xylene can be used.

Alternatively or additionally, one or more of the following binders can be used: a phenyl-methyl silicone resin in xylene (commercially available as SILIKOPHEN® P 80/X from Evonik Tego Chemie GmbH), a phenyl-methyl silicone resin having >95% solids, 2-propanol, 1-methoxy, acetate (commercially available as SILIKOPHEN® P 80/MPA from Evonik Tego Chemie GmbH), a phenyl-methyl silicone resin (commercially available as SILIKOPHEN® P 40/W or SILIKOPHEN® P 50/X from Evonik Tego Chemie GmbH), a silicone-polyester resin (commercially available as SILIKOFTAL® EW/MPA from Evonik Tego Chemie GmbH), a silicone-epoxy resin (commercially available as SILIKOPON® EW, SILIKOPON® EF, or SILIKOPON® EC from Evonik Tego Chemie GmbH), a methyl polysiloxane (commercially available as SILRES® KX from Wacker Chemie AG), a methyl-phenyl polysiloxane in xylene (commercially available as SILRES® REN 60 from Wacker Chemie AG), a methyl-phenyl polysiloxane (commercially available as SILRES® REN 100 or SILRES® 80 from Wacker Chemie AG), a phenyl polysiloxane (commercially available as SILRES® 601 from Wacker Chemie AG), a silicone resin containing phenyl groups (commercially available as SILRES® 602 from Wacker Chemie AG), a phenyl-methyl silicone resin (commercially available as SRP 150 from Momentive Performance Materials, Inc.), a medium-hard phenyl-methyl silicone resin (commercially available as SRP501 from Momentive Performance Materials, Inc.), a medium-hard high-solid phenyl-methyl silicone resin (commercially available as SRP576 from Momentive Performance Materials, Inc.), a soft phenyl-methyl silicone resin (commercially available as SRP851 from Momentive Performance Materials, Inc.), a silicone resin (commercially available as DOW CORNING® 840

Resin, DOW CORNING® 808 Resin, DOW CORNING® 806A, DOW CORNING® 805, DOW CORNING® 217, or DOW CORNING® 233 from DOW CORNING), a sodium silicate (commercially available as CERAMA-BIND™ 642 from Aremco Products, Inc.), a potassium silicate (commercially available as CERAMA-BIND™ 643-1 from Aremco Products, Inc.), a lithium polysilicate (commercially available as CERAMA-BIND™ 830 from Aremco Products, Inc.), and an emulsion of phenyl-methyl polysiloxane resin (commercially available as CERAMA-BIND™ 880 from Aremco Products, Inc.).

Selection of the polymer type and ratio of polymer to solids may affect final paint film properties, such as, but not limited to adhesion, optical properties (light absorption and reflection), corrosion resistance, and long term high temperature durability and thermal shock resistance. The binder concentration for the paint formulation can be within a range of 10% (wt/wt) to 80% (wt/wt), for example, between 20% (wt/wt) and 55% (wt/wt). The binder to solids (e.g., filler and pigment) ratio can be between 1:1 and 3:1, for example, between 1:1 and 2:1.

The glass modifying agent for the paint formulation can be, for example, sodium borate, which may be dispersed as particles, for example, micron or sub-micron sized particles. Additionally or alternatively, sodium borate can be used as anti-corrosive agent for the paint formulation. While not wishing to be bound by any theory, it is believed that the borate ions may neutralize acidic foreign ions and binder decomposition productions as well as act as an anodic passivator thereby forming a protective film. The incorporation of the glass modifying agent in the paint formulation may serve to enhance mechanical stability and/or thermal stability of the paint formulation.

Additionally or alternatively, glass additives may be provided to the paint formulation to influence or affect the mechanical properties of the paint formulation, such as, but not limited to, glass transition temperature ($T_g$), thermal conductivity, electrical conductivity, scratch resistance, film adhesion, thermal resistance, and thermal shock resistance. Additives can include, but are not limited to, oxides such as $Na_2O$, $K_2O$, $Li_2O$, CaO, BaO, MgO, PbO, $Sc_2O_3$, and $CeO_2$, and inorganic and organic boron-based compounds, such as boric acid, boron oxide, metal borides (or refractory metal di-borides $VB_2$, $NbB_2$, $TaB_2$, $TiB_2$, $ZrB_2$, and $LaB_6$) and boron salts. For example, the boron-based additive can be one of disodium tetraborate, potassium tetraborate, or sodium borate.

The glass modifying agent can be in the form of particles having a size less than 150 μm, for example, between 80 μm and 140 μm. The glass modifying agent in the paint formulation can be at a concentration of between about 1% (wt/wt) and about 20% (wt/wt). For example, the glass modifying agent can be at a concentration between about 5% (wt/wt) and about 10% (wt/wt). Curing of the glass modifying agent may result in the formation of a Pyrex-like glass with modified chemical and physical properties.

The resistance of the paint formulation to high temperatures can be increased and/or improved by incorporating a high-temperature inorganic filler therein. The inorganic filler can form layered inorganic microstructures when incorporated into the paint formulation. The inorganic filler can include an oxide, silicate, borate, boride, and/or metal flakes. For example, the inorganic filler can include silicate-based solid material (such as mica, platelet-like mica, talc, or clay), a phosphate, and/or magnesium oxide. Examples include, but are not limited to, (i) oxides (e.g., aluminum oxide); (ii) borides of boron, magnesium, aluminum, silicon, or titanium; (iii) plate-like fillers, such as mica, micaceous iron oxide, and talc; (iv) aluminum; (v) calcium metasilicate; (vi) mixtures thereof. The inorganic filler can be in the form of particles, for example, micron or sub-micron sized particles. The incorporation of the inorganic filler in the paint formulation may serve to enhance high-temperature durability (i.e., at temperatures greater than 350° C., 400° C., 450° C., 500° C., 550° C., 600° C. or higher) of the paint formulation.

Alternatively or additionally, one or more of the following fillers and/or glass additives can be used: a natural coalescence of lamellar minerals including micron-size mica (about 7.5 μm in size) that yields low viscosity in polar coatings, i.e., a leucophyllite (commercially available as PLASTORIT® 0000 available from Imerys Talc), a micaceous iron oxide pigment (commercially available from Rockwood Pigments NA, Inc.), a montmorillonite (commercially available as Montmorillonite K 10 from Sigma-Aldrich), a talc with 10 μm particle size (commercially available as LUZENAC 10M0 from Imerys Talc), an aluminum silicate with a 0.2 μm particle size (commercially available as ASP® G90 from BASF Corporation), an aluminum silicate with a 0.4 μm particle size (commercially available as ASP® 200 from BASF Corporation), a calcined aluminosilicate with a 0.8 μm particle size (commercially available as SATINTONE® 5HB from BASF Corporation), a disodium tetraborate decahydrate (also known as Borax, commercially available from Sigma-Aldrich), micron-size glass frits, modified strontium aluminum polyphosphate hydrate (commercially available as HEUCOPHOS® SRPP from Heubach GmbH), organic modified basic zinc orthophosphate hydrate (commercially available as HEUCOPHOS® ZPO from Heubach GmbH), zinc calcium strontium aluminum orthophosphate silicate hydrate (commercially available as HEUCOPHOS® ZCP-PLUS from Heubach GmbH), zinc aluminum orthophosphate hydrate (commercially available as HEUCOPHOS® ZPA from Heubach GmbH), strontium zinc phosphosilicate (commercially available as HALOX® SZP-391 from Halox), calcium borosilicate (commercially available as HALOX® CW-2230 from Halox), hydrated magnesium silicate (commercially available as NICRON® 403 from Imerys Talc, formerly Luzenac America, Inc.), and magnesium oxide (available from Sigma-Aldrich).

Additionally or alternatively, the inorganic filler can be a material that provides basal cleavage. Incorporation of platelet-like mica into the paint formulation can also strengthen paint adhesion and improve corrosion resistance. In particular, the platelets of the mica align parallel to the surface of the article as the paint dries thereon. This alignment may serve to improve adhesion strength of the paint formulation. Moreover, the platelets may overlap with each other, thereby reinforcing the paint during drying and/or curing. The platelets may also reduce internal stress due to thermal expansion/contraction and increase paint film flexibility and crack-resistance. The platelet-like fillers can also provide a measure of barrier protection, since the platelets align parallel to the article surface and provide low moisture and gas permeability. The relatively high aspect ratio of the individual platelets may also provide beneficial rheological properties and improve sag resistance.

Selection of the filler and the concentration thereof can affect the resulting properties of the paint formulation, such as, but not limited to, optical properties, thermal resistance, adhesion, and corrosion resistance. The filler can be in the form of particles having a size less than 30 μm but greater than 0.5 μm, for example, between 1 μm and 10 μm. The filler in the paint formulation can be at a concentration of between about 1% (wt/wt) and about 20% (wt/wt). For example, the filler can be at a concentration between about 5% (wt/wt) and about 10% (wt/wt).

The paint formulation can be in the form of a liquid composition for application to a surface of an article. The paint formulation can thus include a carrier liquid, such as an aqueous or organic solvent. The solvent can serve as a carrier for the various components of the paint formulation. In addition, the solvent can dissolve the binder of the paint formulation thereby reducing the viscosity thereof to a suitable level for application. Such modes of application can include, but are not limited to, brush, roller, pressure spray, ultrasonic spray, electrostatic spray, and airless spray. After application of the paint formulation, the solvent can evaporate, thus leaving behind the other components of the paint formulation to form the coating on the desired article. The solvent concentration can be in the range from 10% (wt/wt) to 60% (wt/wt), for example, between 10% (wt/wt) and 45% (wt/wt).

Solvents for the paint formulation can include, for example, glycol ethers, aromatic naphtha solvents, members of the xylene family (e.g., m-xylene, p-xylene, o-xylene, and/or mixtures thereof), butyl acetate, toluene, and combinations thereof. For example, the organic solvent can be at least one of propylene glycol mono methyl ether (commercially available as DOWANOL™ PM from Dow Chemical Company), dipropylene glycol mono methyl ether (commercially available as DOWANOL™ DPM from Dow Chemical Company), tripropylene glycol mono methyl ether (commercially available as DOWANOL™ TPM from Dow Chemical Company), propylene glycol mono n-butyl ether (commercially available as DOWANOL™ PnB from Dow Chemical Company), dipropylene glycol mono butyl ether (commercially available as DOWANOL™ DPnB from Dow Chemical Company), tripropylene glycol mono n-butyl ether (commercially available as DOWANOL™ TPnB from Dow Chemical Company), propylene glycol mono propyl ether (commercially available as DOWANOL™ PnP from Dow Chemical Company), dipropylene glycol mono propyl ether (commercially available as DOWANOL™ DPnP from Dow Chemical Company), propylene glycol butyl ether (commercially available as DOWANOL™ TPnB-H from Dow Chemical Company), propylene glycol mono methyl ether acetate (commercially available as DOWANOL™ PMA from Dow Chemical Company), diethylene glycol mono butyl ether (commercially available as DOWANOL™ DB from Dow Chemical Company), other ethylene or propylene glycol ethers, m-xylene, p-xylene, o-xylene, t-butyl acetate, n-butyl acetate, and toluene. Other solvents can also be used according to one or more contemplated embodiments in order to comply with environmental requirements related to volatile organic compounds (VOC).

The paint formulation can include additional agents, such as, but not limited to, a wetting agent, a dispersing agent, a thickening agent, a de-foaming agent, an anti-foaming agent, an electrostatic spray agent, a spray enhancing agent, an anti-sedimentation agent, and an anti-corrosive agent. The dispersing agents can de-agglomerate the particles in the paint formulation and reduce solid precipitation in the paint formulation. Such dispersing agents can include at least one of, for example, an alkylolammonium salt of a block copolymer with acidic groups (commercially available as DISPERBYK®-180 from BYK Additives), a solution of a carboxylic acid salt of polyamine amides (commercially available as ANTI-TERRA®-204 from BYK Additives), a solution of a copolymer with acidic groups (commercially available as DISPERBYK®-110 from BYK Additives), and a copolymer with acidic groups (commercially available as DISPERBYK®-111 from BYK Additives).

The wetting agent can reduce surface tension of the paint formulation and thereby improve paint film properties and adhesion to the surface of the article. Such wetting agents can include a polyether modified poly-dimethyl-siloxane (commercially available as BYK®-333 from BYK Additives). De-foaming agents can include a silicone-free solution of foam destroying polymers (commercially available as BYK®-052, BYK®-054, or BYK®-057 from BYK Additives), a polyacrylate-based surface additive (commercially available as BYK®-392 from BYK Additives), or a silicone-free air release additive (commercially available as BYK®-A 535 from BYK Additives).

The thickening and/or anti-sedimentation agent can provide the desired viscosity of the paint formulation, for example, based on the method of coating and/or to reduce particle sedimentation. Such thickening and/or anti-sedimentation agents can include a solution of a modified urea (commercially available as BYK®-410 from BYK Additives), bentonites, and hydrophobic pyrogen silica (commercially available as AEROSIL® R 972 from Evonik Industries). Electrostatic spray agents may increase the conductivity of the paint formulation to assist in spraying. Such spray agents can include a cationic compound additive (commercially available as EFKA® 6780 from BASF Corporation) or a conductivity promoter for coatings (commercially available as LANCO™ STAT L 80 from Lubrizol Deutschland GmbH).

Anti-corrosion additives can interact directly or indirectly with anodic/cathodic reactions at the painted surface so as to reduce and/or prevent corrosion. Such anti-corrosion can include calcium borosilicate (commercially available as Halox® CW-291 TDS from Halox), strontium zinc phosphosilicate (commercially available as Halox® SZP-391 from Halox), organically modified mineral pigment (commercially available as Halox® 410 from Halox) organically modified basic zinc orthophosphate hydrate (commercially available as HEUCOPHOS® ZPO from Heucotech, Ltd.), zinc aluminum orthophosphate hydrate (commercially available as HEUCOPHOS® ZPA from Heucotech, Ltd.), and strontium aluminum polyphosphate hydrate (commercially available as HEUCOPHOS® SAPP from Heucotech, Ltd.). The anti-corrosion additive and/or other additive concentration can be in the range from 1% (wt/wt) to 20% (wt/wt), for example, between 1% (wt/wt) and 10% (wt/wt).

The paint formulation may be applied by itself or in combination with one or more surface treatments or other layers. For example, the metal article may be provided with one or more of the following: (1) a substrate surface treatment (e.g., grit blasting); (2) corrosion protection (e.g., a black oxidation passivation layer, a sol-gel sealing layer (e.g., $ZrO_2$)); (3) a high-temperature heat-resistant solar absorbing coating (e.g., the paint formulation); (4) an anti-reflection coating (e.g., an $SiO_2$ layer).

Figure 3A:
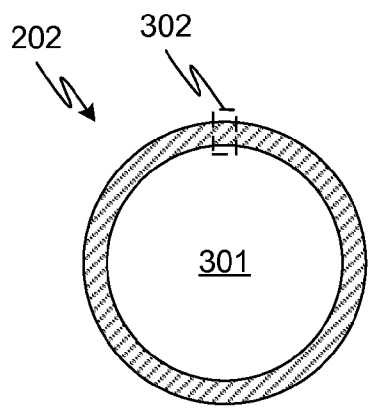
FIG. 3A is a simplified diagram illustrating a cross-sectional view of one of the receiver pipes of FIG. 2A, according to embodiments of the disclosed subject matter.
Figure 3B:
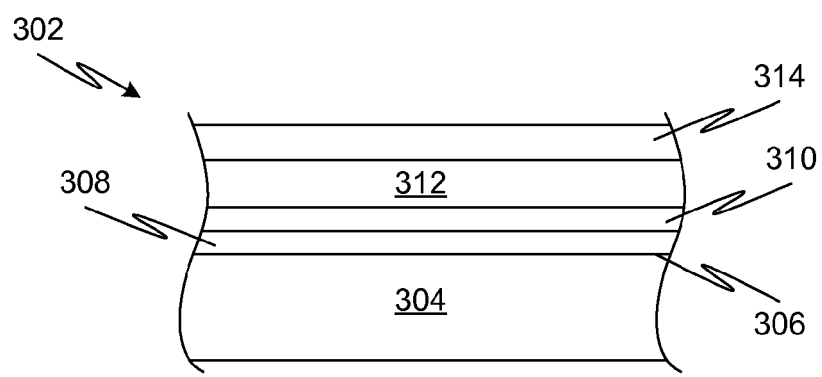
FIG. 3B is a simplified diagram illustrating a cross-sectional view of a surface section of the receiver pipe of FIG. 3A, according to embodiments of the disclosed subject matter.

In an embodiment, the metal article is a pipe 202 of a receiver 200 in a solar thermal system. For example, one or more of the coatings/treatments described herein may be applied to at least a portion of the exterior surface of pipe 202, as shown in FIGS. 3A-3B. FIG. 3B shows a close-up cross-sectional view 302 of pipe 202 of FIG. 3A. It is noted that the layers illustrated in figures have not been drawn to scale. Rather, the relative sizes of the layers have been exaggerated for illustration purposes. Pipe 202 has a metal wall 304 separating an interior volume 301 of pipe 202 from the external environment. Water and/or steam (or other heat transfer or working fluid), which may be preheated and/or pressurized, flows through the pipe interior volume. An exterior surface side 306 of the metal wall 304 can receive reflected insolation from the field of heliostats, so as to heat the metal wall 304 and thereby the flowing water and/or steam. The one or more coatings applied to the exterior surface 306 can improve absorption of solar insolation and/or protect the metal surface.

The exterior surface side 306 of the metal wall 304 can optionally be pre-treated prior to application of any other layers. For example, the surface 306 can be subjected to grit-blasting. Alternatively or additionally, one or more layers of paint or other formulations can optionally be provided between the paint formulation layer 312 and the pipe surface 306. For example, a passivation layer 308 and/or a corrosion protection layer 310 can be provided over the surface 306. For example, when the metal pipe is formed from carbon steel, the passivation layer 308 can be formed using a black oxidation reaction with the exterior surface 306. The corrosion protection layer 310 can be a sol-gel corrosion protection coating, for example, a zirconium-based sol-gel, applied on the passivation layer 308 (or directly to the metal surface 306) in order to seal the underlying layers and thereby improve corrosion resistance. The sol-gel layer 310 can be applied using any number of techniques, including, but not limited to, brushing, spraying, dipping, and spin-coating.

Over the exterior surface 306, for example, on the corrosion protection layer 310 or passivation layer 308, one or more coatings 312 of a solar paint formulation can be applied. The thickness of the solar paint formulation layer 312 can be 50 µm or less, or at least 50 µm, 70 µm, 100 µm or more and/or at most 500 µm, 300 µm, 200 µm or less. After curing, the paint can have a thickness in the range from 50 µm to 200 µm, for example, between 70 µm and 110 µm. Prior to curing, the paint can have a wet film thickness in the range from 75 µm to 300 µm. Alternatively or additionally, each layer of the applied paint formulation can have a wet film thickness of about 50-60 µm.

Over the exterior surface 306, for example, on the paint formulation layer 312, an optical anti-reflection layer 314 can optionally be applied. The optical anti-reflection layer 314 may serve to reduce reflection of the solar insolation incident thereon and thereby reduce energy losses. For example, the anti-reflection layer 314 can be a silica sol-gel layer. The sol-gel layer 314 can be applied using any number of techniques, including, but not limited to, brushing or spraying. Alternatively or additionally, one or more additional layers (not shown) can be provided over exterior surface 306, to which the pre-treatment and/or the other layers 308-314 can be applied. Alternatively or additionally, one or more additional layers (not shown) can be provided over exterior surface 306 and the other layers 308-314.

Figure 4:
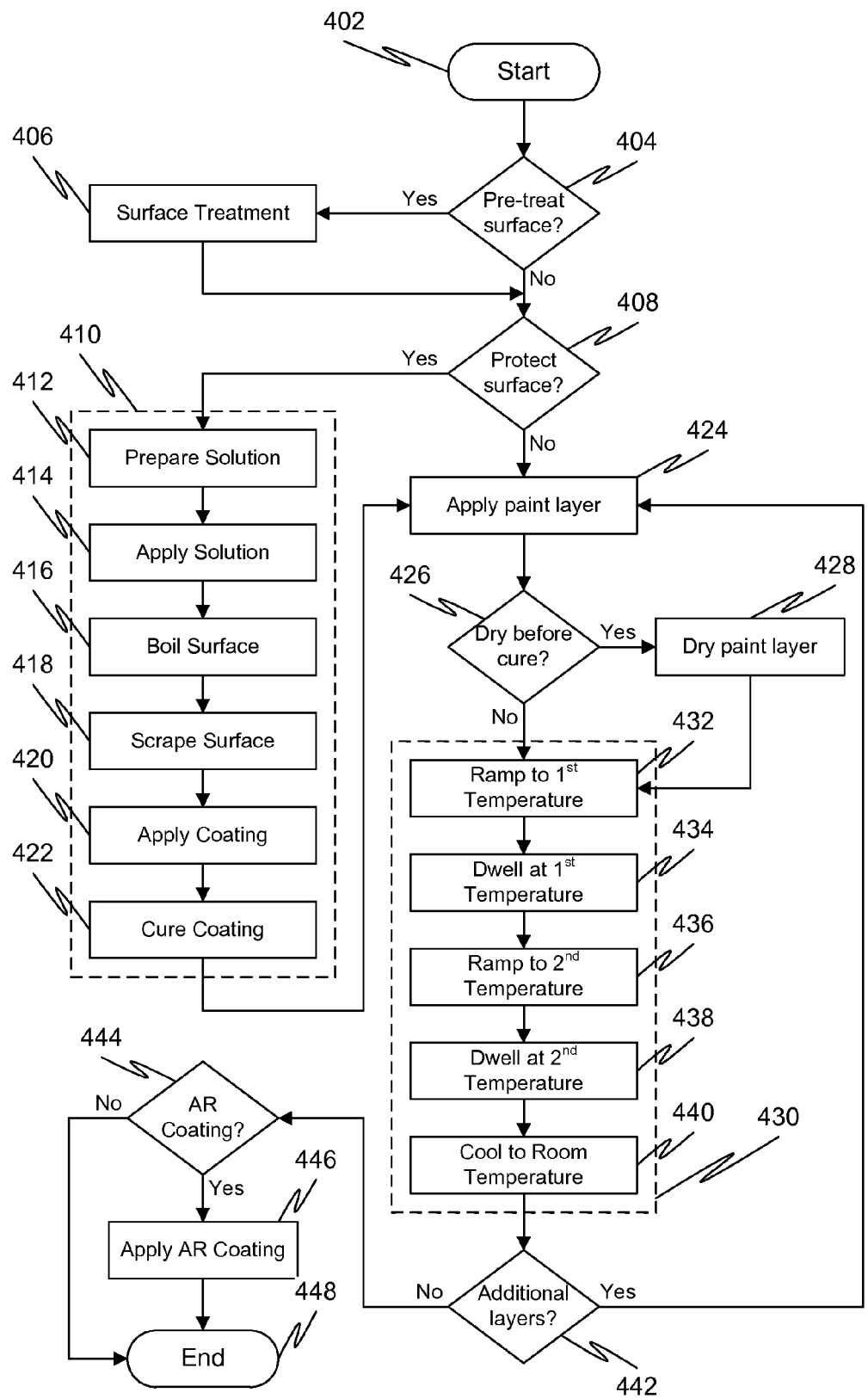
FIG. 4 is a process flow diagram of a method for applying a paint formulation, according to embodiments of the disclosed subject matter.

An exemplary method for forming a high-temperature high-solar-absorptivity coating on a metal article, such as that shown in FIGS. 3A-3B, is shown in FIG. 4. The method can begin at 402 and proceed to 404. At 404, it is determined if an optional surface pre-treatment is desired. If no surface treatment is desired, the method proceeds to 408. Otherwise, the method proceeds to 406, where a surface pre-treatment can be applied to the metal surface of the article to be painted (or to another surface of the article to which subsequent coatings will be applied). For example, the surface pre-treatment can be a grit-blasting treatment. Deposition of the next layer on the grit-blasted surface may be applied within 12 hours. After completion of the surface treatment, the method proceeds to 408.

At 408, it is determined if an optional passivation layer and/or corrosion protection layer is desired. If no passivation or corrosion protection layer is desired, the method proceeds to 424. Otherwise the method proceeds to corrosion protection at 410, which can include steps 412-422. Corrosion protection 410 can begin with preparation of a black oxidation solution at 412. The black oxidation solution can be prepared from a mixture of concentrated hydrochloric acid (e.g., at between 2% and 10% of the total volume) and concentrated nitric acid (e.g., at between 2% and 10% of the total volume) added to water. The hydrochloric acid can be analytical grade at a concentration of 38% w/w (commercially available from J. T. Baker) and the nitric acid can be analytical grade at a concentration of 70% w/w (commercially available from J. T. Baker).

To this mixture, carbon steel shavings (e.g., at a concentration of between 5% (wt/wt) and 20% (wt/wt)) can be added. For example, a total of 150 g of carbon steel shavings can be added to a mixture of the concentrated acids (e.g., 50 ml of 38% hydrochloric acid and 50 ml of 70% nitric acid). First, a portion of the hydrochloric acid (e.g., 20 ml) and a portion of the nitric acid (e.g., 20 ml) can be combined together in a flask. To this flask, a portion of the carbon steel shavings (e.g., 70-80 g) can be added. After a period of time (e.g., 35-40 minutes), the remainder of the acids (e.g., 30 ml of each acid) can be added to flask. The remainder of the carbon steel shavings can subsequently be added to the flask. The resulting aggressive reaction in the mixture can be allowed to proceed for 24-48 hours. Distilled water can then be added to the flask in sufficient quantities to bring the total volume of solution in the flask to 1000 ml. The method can then proceed to 414.

At 414, the black oxidation solution can be applied to the metal surface of the article to be painted. Application of the solution to the surface can be carried out by any number of techniques, for example, by brushing or spraying the solution onto the surface. The surface can then be allowed to dry for a period of time, for example, for 24-48 hours. The method proceeds to 416, where the metal article, or at least the treated surface thereof, is immersed in boiling water (e.g., at approximately 100° C.) for a period of time, for example, for 10-30 minutes (e.g., 15 minutes) and/or until the surface turns black in visual appearance. The surface can then be cooled to room temperature and wiped to remove any loose residue. The method can then proceed to 418, where the blackened surface of the metal article can be scraped in order to remove loosely attached particles from the surface, leaving behind a passivation layer on the surface of the metal article.

After scraping of the surface, the method can proceed to 420 where a corrosion protection coating can be applied over the treated surface of the metal article. For example, a sol-gel corrosion protection coating can be applied to the passivation layer in order to seal the layer and thereby improve overall resistance to corrosion. The corrosion protection coating may be applied in any manner including, but not limited to, brushing, spraying, dipping, and spin-coating. For example, to form the corrosion protection coating, one or more of the following precursors can be used: n-propanol (for example, anhydrous 1-propanol commercially available as item #41842 from Alfa Aesar), a zirconium(n) propoxide (for example, zirconium(IV) propoxide solution commercially available as item #333972 from Sigma-Aldrich), acetyl acetone (for example, 2,4-pentanedione commercially available as item #A14117 from Alfa Aesar), ethanol (for example, 99.9% ethanol commercially available as item #8006 from J. T. Baker), tetraethyl orthosilicate (TEOS) (for example, 98% tetraethoxysilane commercially available as item #SIT7110.0 from Gelest, Inc.), and ammonium hydroxide (for example, 28-30% ammonium hydroxide commercially available as item #9721-01 from J. T. Baker).

Alternatively or additionally, the corrosion protection and/or the paint layer may use any number of mechanisms to protect the underlying metal surface of the painted article from corrosion, including, but not limited to, a barrier effect, a barrier pigment effect, sacrificial pigments, vehicle enhancement (i.e., via film formulation and development), and active inorganic pigmentation. The barrier effect can provide a protective, physical shield between a metal surface of the painted article and the elements in the environment, e.g., air, moisture, and/or chemicals. For example, a corrosion protection layer employing the barrier effect can include a metal coating.

The barrier pigment effect can result from pigments added to the paint or other layers for color, but which also serve to protect the underlying metal surface of the painted article from corrosion by reinforcing the paint film and limiting permeability. For example, the barrier pigment effect may be present when lamellar-type pigments (e.g., mica or micaceous iron oxides) and/or metallic flakes (e.g., flakes of aluminum, bronze, or steel). These pigments or flakes form a wall of flat, thin particles. Since water or other fluids can only reach the underlying metal surface by following a tortuous path through the wall of particles, water-resistance of the layer is improved.

Sacrificial pigments added to the corrosion protection or paint layer can offer cathodic or anodic protection. For example, zinc can be used in a protective coating for ferrous substrates. When incorporated into the protective coating, the zinc can act as a cathode during the corrosion process, thereby reducing the corrosive effect. Active inorganic pigments can also be added to the paint formulation to reduce corrosion. In particular, a protective coating can be formed on the surface of the metal due to a chemical reaction involving active inorganic pigments. Alternatively or additionally, the inorganic pigments may inhibit a chemical reaction between the metal surface and a corrosive solution from the environment. Such inorganic pigments can include, but are not limited to, borates, chromates, leads, molybdates, phosphates, phosphites, and silicates.

With regard to vehicle enhancement, the selection and inclusion of certain components in the paint formulation can also contribute to corrosion protection of the underlying metal surface of the painted article. Pigments added to the paint formulation can reinforce the structure of the applied paint and help reduce permeability of the paint. Additives can enhance other characteristics of the applied paint, such as drying time, paint flow, and coating adhesion. Appropriate selection of binder materials and optimization of manufacturing of the paint formulation may also improve corrosion protection.

In an embodiment, the corrosions protection layer can be a zirconium-based sol-gel. Such a sol-gel can be prepared by adding zirconium n-propoxide to anhydrous n-propanol solvent 30-40% of the total volume with 5-10% of acetyl acetone and 1-5% water. For example, 451 ml of n-propanol, 337.5 ml of zirconium n-propoxide, and 76.5 ml of acetyl acetone can be mixed together, to which 100 ml of n-propanol and 27.5 ml of distilled water can be added. After several hours (e.g., 3 hours) of stirring, the sol-gel can be ready for application to the metal article. The method can then proceed to 422, where the sol-gel corrosion protection layer is cured in air at a temperature between 250° C. and 600° C. The method can proceed to 424.

At 424, a layer of the paint formulation can be applied over the surface of the metal article (or a portion of the surface exposed to solar insolation). The paint formulation can be applied at relatively low temperature, for example, less than 100° C., 60° C., 40° C. or lower, such as at room temperature. The paint formulation can be applied to the surface using any number of application techniques, including but not limited to, brushing, coating using a hand roller, pressure-spraying, electrostatic-spraying, and airless-spraying. The wet thickness of the resulting paint coating on the article can be in the range from 1 μm to 100 μm, with subsequent dried thicknesses (i.e., after curing), in the range from 0.1 μm to 50 μm. Greater film thicknesses for the paint coating can be obtained by sequentially depositing and curing additional layers on top of a dried/cured paint coating. The method can proceed to 426.

At 426, it is determined if the paint coating should be dried prior to curing. If drying is not desired prior to curing, the method proceeds to curing at 430. Otherwise the method proceeds to 428, where the paint coating is dried. For example, the paint coating can be dried at room temperature (i.e., 25° C.) for several hours (e.g., 24-48 hours). Alternatively or additionally, the paint coating can be dried at an elevated temperature (e.g., within the range from 50° C. to 70° C.) for several hours (e.g., 1-3 hours). After drying the method can proceed to curing at 430, which can include steps 432-440. Curing can be performed at any time after application of the paint coating to the metal article, for example, in the factory or in the field. Any heating source can be used to heat the metal article in the curing process. For example, an oven can be used to raise the temperature of the metal article and to reliably maintain the elevated temperature of the metal article for a given period of time.

Curing 430 can begin with ramping the temperature of the metal article to a first elevated temperature at 432. The ramping can be performed using relatively slow heating profiles, since the heating rate may affect the final film performance. A heating rate that is too high may result in a porous paint coating, which may exhibit low thermal and/or corrosion resistance. For example, the heating rate can be in the range from 2° C./minute to 10° C./minute. The curing process can be performed at a temperature greater than that of the drying, for example, in the range from 200° C. to 600° C. For example, the first temperature can be 250° C. Thus, the temperature of the metal article can be increased during the first ramp phase 432 from the drying temperature (e.g., 25° C.) to the first temperature (e.g., 250° C.) at the desired heating rate (e.g., 2° C./minute). The method then proceeds to 434.

At 434, the temperature of the metal article is maintained at the first elevated temperature for a predetermined period of time. For example, during this first dwell phase 434, the temperature of the metal article can be maintained at 250° C. for a period of 1 hour. After the dwell phase 434, the method can proceed to 436, where the temperature of the metal article is increased to a second elevated temperature at a second heating rate. For example, the second heating rate can also be in the range from 2° C./minute to 10° C./minute, and the second temperature can be 350° C. Thus, the temperature of the metal article can be increased during the second ramp phase 436 from the first temperature (e.g., 250° C.) to the second temperature (e.g., 350° C.) at the desired heating rate (e.g., 2° C./minute). The method can then proceed to 438, where the temperature of the metal article is maintained at the second elevated temperature for a predetermined period of time. For example, during this second dwell phase 438, the temperature of the metal article can be maintained at 350° C. for a period of 2 hours. Fewer heating/ramping and/or dwell phases can be provided to cure the paint coating. Alternatively, additional heating/ramping and/or dwell phases can be provided to cure the paint coating. For example, a third heating phase can be provided to heat the metal article to a third elevated temperature (e.g., 500° C.) at a third heating rate (e.g., 2° C./minute).

The method can then proceed to 440, where the metal article is slowly cooled to room temperature, for example, by allowing the metal article to cool in the oven with the door thereof ajar. Alternatively or additionally, cooling of the metal article may also be controlled to follow a pre-defined cooling rate (e.g., a rate between −2° C./minute and −10° C./minute, such as −5° C./minute). After the heating/ramping and/or dwell phases, the paint coating is cured such that the organic binder irreversibly converts to an inorganic binder (e.g., a ceramic binder). The method can then proceed to 442. At 442, it is determined if additional paint coatings are desired, for example, to provide a desired thickness of the paint coating. If so, the method proceeds to 424, where the paint application, drying, and curing processes are repeated. Otherwise the method proceeds to 444.

At 444, it is determined if an anti-reflection coating is desired. If an anti-reflection coating is not desired, the method can terminate at 448. Otherwise, the method proceeds to 446 where an anti-reflection coating is formed on the metal article. In particular, the anti-reflection coating can be applied to the top surface of the paint coating in order to reduce reflection of solar insolation therefrom, thereby reducing energy losses. For example, the anti-reflection coating can be a silica sol-gel coating. The silica sol-gel coating can be prepared by adding TEOS (e.g., at a concentration of 5-20% of the total volume) to ethanol. For example, 11 ml of TEOS can be gradually added to and mixed with 117 ml of ethanol. The resulting solution can be allowed to polymerize in an atmosphere of ammonium vapors (e.g., ammonium hydroxide) for a period of 24-48 hours. After the polymerization, the solution can be applied to the paint coating (or any other layer on the metal article) using any application technique, including, but not limited to spraying or brushing. Drying and/or curing of the sol-gel coating can subsequently be performed. The method can terminate at 448.

Durability and reliability of the paint formulation can be verified by subjecting painted articles to one or more accelerated tests pursuant to accepted standards. For example, the following tests can be performed: (1) optical performance test (i.e., a solar absorptivity test); (2) humidity test (85% RH at a temperature of 85° C. for 250 hours); (3) high temperature test (dry heat at a temperature between 350° C. and 650° C. for 500 hours in air); (4) neutral salt spray test (exposure to salt spray for 24 hours); (5) adhesion test—ASTM D3359-08 (Standard Test Method for Measuring Adhesion by Tape); (6) high temperature accelerated life test (ALT) (dry heat, ten cycles at a temperature between 600° C. and 650° C. for 100 hours each cycle, total duration of at least 1000 hours).

For example, the optical performance test can measure film reflectance/absorptivity according to ASTM D4587-05 (Standard Practice for Fluorescent UV-Condensation Exposures of Paint and Related Coatings). In particular, the test can evaluate the absorptivity of the coatings using a measuring device that provides a reliable indicator of overall absorptivity (i.e., solar spectrum AM 1.5). The measuring device can be any reflectance or absorptivity measuring device known in the art, such as a Konica Minolta CM2600d or CM700 portable spectrophotometer. The measurement can be taken with an 8 mm diameter aperture and medium aperture value (MAV) setting. Specular component included (SCI) and specular component excluded (SCE) data can be measured. For the illumination, any setting that best approximates the solar spectrum AM 1.5 can be used, for example, D65. For example, measurements can be recorded at wavelengths in the range from 400 nm to 740 nm at 10 nm intervals. Observation can be at 10° from the surface normal. Separate measurements can be taken at the best location on the coating, the worst location on the coating (excluding edge effects), and at any significant defect or optical anomaly. The measurement data can be compared with the initial data for the sample, for example, to ascertain any changes to optical properties that may result from the one or more thermal or environmental tests. As such, the coating can be measured both before and after all tests in order to determine degradation. Desired target absorptivity for the coating can be at least 97%, although absorptivity values for the visible spectrum as low as 95% may be designated as passing for solar thermal applications.

The humidity test can subject the paint coating to relatively harsh conditions of relatively high humidity. For example, the painted article can be subjected to constant exposure in a humidity chamber at 85° C. and 85% RH for a duration of at least 250 hours. The optical properties of the coating can be checked every 50 hours during the test, for example, using the optical performance test methodology noted above. Visual inspection can also be performed for evidence of corrosion, peeling, and/or other signs of coating degradation. A coated article may be considered to pass the test if it emerges after the 250 hours with less than a 1% change in absorptivity and no visible degradation/damage.

The neutral salt spray (NSS) test can also subject the paint coating to relatively harsh environmental conditions. For example, the NSS test can be conducted in accordance with ASTM B117-09 (Standard Practice for Operating Salt Spray (Fog) Apparatus). The NSS test can be conducted for a time period of 24 consecutive hours. After the test, optical properties can be checked using the optical performance methodology noted above. Visual inspection can also be performed for evidence of corrosion, peeling, and/or other signs of coating degradation. A coated article may be considered to pass the NSS test if it emerges after the 24 hours with less than a 1% change in absorptivity and no visible degradation/damage.

The high temperature test can be used to simulate long-term exposure of the paint coating to high temperatures, for example, as experienced as part of the solar thermal system. For example, the paint coatings can be exposed to dry heat in air at a temperature in the range from 350° C. to 600° C. for at least 500 hours. The high-temperature exposure may be constant or cyclical. For example, a coating can be exposed to a temperature of 600° C. with 0% RH for 1000 hours, thereby simulating exposure of the coating over a 3-5 year lifespan. The optical properties of the coating can be checked every 100 hours during the test, for example, using the optical performance test methodology noted above. Visual inspection can also be performed for evidence of corrosion, peeling, and/or other signs of coating degradation. A coated article may be considered to pass the test if it emerges after the test with less than a 1% change in absorptivity and no visible degradation/damage.

The following examples are presented in order to more fully illustrate some embodiments of the disclosed subject matter. However, the examples should not be understood to or construed as limiting the scope of the disclosed subject matter.

Example 1

Paint formulations were prepared using the components listed in Table 1, the components being added to each paint formulation in the order listed in the table. Several different formulations using the recipe of Table 1 were prepared using different binder components, according to the listing of binders in Table 2. The performance of the resulting formulations is listed in Table 2.

For example, a quantity of paint formulation (for example, 100 g) was prepared as follows. A container (250 ml) was filled with m-Xylene in the desired quantity listed in Table 1 (i.e., 23.34 g). The respective quantities of dispersing agent (i.e., 0.93 g of DISPERBYK®-180) and wetting agent (i.e., 0.28 g of BYK®-333) were then sequentially added to the solvent in the container. The resulting solution was mixed for 15 minutes (at a rate of 1000 minutes$^{-1}$ using a 2.5 cm propeller). The appropriate quantity of the binder (i.e., 54.29 g of one of the binders in Table 2, 50% in organic solvent) was then added to the solution. The solution was then mixed for 30 minutes (at a rate of 2000 minutes$^{-1}$). The pigment was then gradually added in small portions while stirring until a sufficient quantity of the pigment (i.e., 15.56 g of Black-444) had been added. The dispersion was subsequently mixed for another 30 minutes (at a rate of 1200 minutes$^{-1}$). The final component of filler was gradually added in small portions while stirring (at a rate of 1200 minutes$^{-1}$) until a sufficient quantity of the filler (i.e., 5.6 g of PLASTORIT® 0000) had been added. After the addition of the filler was completed, the stirring rate was increased to 2000 minutes$^{-1}$. Stirring at this rate continued for 30 minutes, after which the stirring ceased and the dispersion was allowed to stand for 20 minutes before use, for example, to eliminate any bubbles that may have formed.

The paint formulation was applied in two layers on carbon steel plates (having a size of 60 mm×60 mm) which had been grit-blasted prior to paint application. Each paint formulation layer was applied to the plate using a hand-roller coating technique to a wet thickness of approximately 100 µm. The first paint layer was applied and cured before application of the second paint layer. Thus, each paint layer was cured separately. Each paint layer was cured using the drying/curing profile discussed above, i.e., drying at 25° C. for 18-24 hours, heating in an oven from 25° C. to 250° C. at 2° C./min, dwelling at 250° C. for 1 hour, heating from 250° C. to 350° C. at 2° C. per minute, and dwelling at 350° C. for 2 hours. The painted plates were then allowed to cool to room temperature, for example, in the oven with the door ajar. The final dry thickness of each film layer was between 30 µm and 50 µm.

Each plate was subjected to a number of the durability/reliability tests described above, including an adhesion test, a humidity test, a solar absorptivity test, and a heat resistance test. The results for the paint formulations incorporating different types of binder are summarized in Table 2. While the paint formulations using the different binders demonstrated excellent adhesion and humidity performance, many of these formulations undergoing the heat resistance test (i.e., storage at 600° C. for 100 hours) showed degradation, as indicated in Table 2.

TABLE 1

Paint formulations for different binders.

| Component | Type | Amount (% wt/wt) |
| --- | --- | --- |
| Organic Solvent | Xylene | 23.34 |
| Wetting Agent | BYK ®-333 | 0.28 |
| Dispersing Agent | DISPERBYK ®-180 | 0.93 |
| Organic Binder | See Table 2 | 54.29 |
| Black Pigment | Black-444 | 15.56 |
| Inorganic Filler | PLASTORIT ® 0000 | 5.60 |

TABLE 2

Results of paint formulations (from Table 1) with different binders.

| | Tests | | Coating Absorptivity (% SCI) | | Appearance |
| --- | --- | --- | --- | --- | --- |
| Binder Type | Adhesion | Humidity | After 2 hrs @ 350° C. | After 100 hrs @ 600° C. | After 100 hrs @ 600° C. |
| SRP501 | Excellent | Excellent | 95.4 | 97.2 | Partially Peeling |
| SRP851 | Excellent | Excellent | 95.33 | N/A | Total Peeling |
| SRP150 | Excellent | Excellent | 96.13 | N/A | Partially Grey |
| SRP576 | Excellent | Excellent | 95.39 | N/A | Degradation |
| SILIKPHEN ® P80/MPA | Excellent | Excellent | 95.43 | 96.17 | Degradation |
| SILIKOPON ® EC | Excellent | Excellent | 95.28 | N/A | Degradation |
| SILIKOPON ® EW | Excellent | Excellent | 95.28 | N/A | Degradation |
| SILIKOPHEN ® P80/X | Excellent | Excellent | 95.56 | 95.92 | Partially Grey |
| CERAMA-BIND ™ 880 | Excellent | Excellent | 95.64 | N/A | Degradation |
| SILRES ® REN 60 | Excellent | Excellent | 95.19 | 96.8 | Partially Peeling |

Example 2

Paint formulations were prepared using the components listed in Table 3, the components being added to each paint formulation in the order listed in the table. Several different formulations using the recipe of Table 3 were prepared using different filler components, according to the listing of fillers in Table 4. The formulations in Example 2 were prepared using the same methodology as noted above for Example 1.

Each plate having the paint formulation thereon was subjected to a number of the durability/reliability tests described above, including an adhesion test, a humidity test, a solar absorptivity test, and a heat resistance test. The results for the paint formulations incorporating different types of fillers are summarized in Table 4. The paint formulations using the different fillers demonstrated excellent adhesion and humidity performance as well as suitable heat resistance with final absorptivities in the range of 96.1% to 96.8%. However, the use of PLASTORIT® 0000 as the filler showed relatively superior performance, especially with respect to the accelerated high temperature storage test (i.e., 200 hours at 600° C.).

TABLE 3

Paint formulations for different fillers.

| Component | Type | Amount (% wt/wt) |
|---|---|---|
| Organic Solvent | Xylene | 12.3 |
| Dispersing Agent | DISPERBYK ®-180 | 0.9 |
| Wetting Agent | BYK ®-333 | 0.6 |
| Dispersing Agent | ANTI-TERRA ®-204 | 0.1 |
| Organic Binder | SILRES ® REN 60 | 64.6 |
| Black Pigment | Black-444 | 10.3 |
| Inorganic Filler | See Table 4 | 11.3 |

TABLE 4

Results of paint formulations (from Table 2) with different fillers.

| | Tests | | Coating Absorptivity (% SCI) | | Appearance | |
|---|---|---|---|---|---|---|
| Filler Type | Adhesion | Humidity | After 2 hrs @ 350° C. | After 100 hrs @ 600° C. | After 100 hrs @ 600° C. | After 200 hrs @ 600° C. |
| Montmorillonite K 10 | Excellent | Excellent | 96.64 | 96.72 | Excellent | 100% Peeling |
| ASP ® G90 | Excellent | Excellent | 95.35 | 96.5 | Excellent | 30% Peeling |
| ASP ® 200 | Excellent | Excellent | 96.3 | 96.1 | Excellent | 100% Peeling |
| SATINTONE ® 5HB | Excellent | Excellent | 96.6 | 96.5 | Excellent | 100% Peeling |
| Aluminum powder | Excellent | Excellent | 96.49 | 96.55 | Excellent | 100% Peeling |
| Aluminum oxide | Excellent | Excellent | 96.17 | 96.8 | Excellent | 100% Peeling |
| Micaceous iron oxide | Excellent | Excellent | 96.32 | 96.5 | Good | No Peeling |
| PLASTORIT ® 0000 | Excellent | Excellent | 95.8 | 96.6 | Excellent | No Peeling |

Example 3

The paint formulation was prepared using the components listed in Table 5, the components being added to the paint formulation in the order listed in the table. In contrast to the prior examples, the paint formulation of Example 3 includes sodium borate as a glass additive in the presence of BYK®-410 as a thickening agent.

The formulations in Example 3 were prepared using a similar methodology as noted above for Example 1. However, the paint formulation was applied in three layers on carbon steel plates (having a size of 60 mm×60 mm) which had been grit-blasted prior to paint application. Each paint formulation layer was applied to the plate using a hand-roller coating technique or spray coating technique to a wet thickness of approximately 100 μm. Each paint layer was applied and cured before application of the subsequent paint layer. Thus, each paint layer was cured separately. Each paint layer was cured using a drying/curing profile of drying in an oven at 70° C. for 2 hours, heating in an oven from 70° C. to 250° C. at 5° C./min, dwelling at 250° C. for 1 hour, heating from 250° C. to 350° C. at 5° C. per minute, and dwelling at 350° C. for 2 hours. The painted plates were then allowed to cool to room temperature, for example, in the oven with the door ajar. The final dry film thickness was between 80 μm and 100 μm.

Each plate having the paint formulation thereon was subjected to a number of the durability/reliability tests described above, including an adhesion test, a humidity test, a solar absorptivity test, and a heat resistance test. The results for the paint formulations incorporating the glass additive are summarized in Table 6. The paint formulations demonstrated excellent adhesion, corrosion resistance, and NSS performance. The absorptivity of the paint formulation after curing was in the range of 95.3% to 95.5%. After heat resistance testing (i.e., five heating cycles of 100 hours at 600° C. per cycle), the paint formulation showed no degradation or peeling and had final absorptivity in the range of 95.8% to 96.5%.

Example 3 was repeated using the same paint formulation but with a final dry film thickness of between 50 μm and 60 μm. The thinner paint formulation exhibited an absorptivity after curing (i.e., after 2 hours at 350° C.) in the range of 95.3% to 95.5% and an absorptivity after a heat resistance test (after 100 hours at 600° C.) in the range of 93% to 95.5% without film degradation or peeling. Sodium borate thus enhances the coating heat resistance for long term applications.

TABLE 5

Paint formulation with sodium borate.

| Component | Type | Amount (% wt/wt) |
|---|---|---|
| Organic Solvent | m-Xylene | 22.60 |
| Dispersing Agent | DISPERBYK ®-180 | 0.74 |
| Wetting Agent | BYK ®-333 | 0.50 |
| Dispersing Agent | ANTI-TERRA ®-204 | 0.08 |
| Organic Binder | SILRES ® REN 60 | 53.20 |
| Black Pigment | Black-444 | 8.63 |
| Inorganic Filler | PLASTORIT ® 0000 | 9.47 |
| Glass Additive | Sodium borate | 3.78 |
| Thickening Agent | BYK ®-410 | 1.00 |

TABLE 6

Results of paint formulation from Table 5.

| | | Tests | | Coating Absorptivity (% SCI) | |
|---|---|---|---|---|---|
| Adhesion | Humidity | Neutral Salt Spray (8 hrs & 24 hrs) | After 500 hrs @ 600° C. (5 heat cycles) | After 2 hrs @ 350° C. | After 500 hrs @ 600° C. |
| Excellent | Excellent | Excellent | Excellent (no peeling) | 95.3-95.5 | 95.8-96.5 |

Example 4

The paint formulation was prepared using the components listed in Table 7, the components being added to the paint formulation in the order listed in the table. In contrast to the prior examples, the paint formulation of Example 4 is applied to T-22 alloy steel.

The formulations in Example 4 were prepared using a similar methodology as noted above for Example 3. However, the paint formulation was applied in three layers on T-22 alloy steel plates (having a size of 60 mm×60 mm) which had been grit-blasted prior to paint application. Each paint formulation layer was applied to the plate using a spray coating technique to a wet thickness of approximately 50-60 μm. Each paint layer was applied and cured before application of the subsequent paint layer. Thus, each paint layer was cured separately. Each paint layer was cured using a drying/curing profile of drying in an oven at 70° C. for 2 hours, heating in an oven from 70° C. to 250° C. at 2° C./min, dwelling at 250° C. for 1 hour, heating from 250° C. to 350° C. at 2° C. per minute, dwelling at 350° C. for 2 hours, and heating from 350° C. to 500° C. at 2° C. per minute. The painted plates were then allowed to cool to room temperature, for example, in the oven with the door ajar. The final dry film thickness was between 80 μm and 100 μm.

Each plate having the paint formulation thereon was subjected to a number of the durability/reliability tests described above, including an adhesion test, a humidity test, a solar absorptivity test, and a heat resistance test. The results for the paint formulations incorporating the glass additive are summarized in Table 8. The paint formulations demonstrated excellent adhesion, corrosion resistance, and NSS performance. The absorptivity of the paint formulation after curing was in the range of 96.1% to 96.4%. After heat resistance testing (i.e., ten heating cycles of 100 hours at 600° C. per cycle), the paint formulation showed no degradation or peeling and had a final absorptivity in the range from 95.5% to 96.2%.

TABLE 7

Paint formulation for use on T-22 Steel Alloy.

| Component | Type | Amount (% wt/wt) |
|---|---|---|
| Organic Solvent | m-Xylene | 22.63 |
| Dispersing Agent | DISPERBYK ®-180 | 0.76 |
| Wetting Agent | BYK ®-333 | 0.51 |
| Dispersing Agent | ANTI-TERRA ®-204 | 0.08 |
| Organic Binder | SILRES ® REN 60 | 53.72 |
| Black Pigment | Black-444 | 8.72 |
| Inorganic Filler | PLASTORIT ® 0000 | 9.56 |
| Glass Additive | Sodium borate | 3.82 |

TABLE 8

Results of paint formulation from Table 7 applied to T-22 Steel Alloy.

| | | Tests | | Coating Absorptivity (% SCI) | |
|---|---|---|---|---|---|
| Adhesion | Humidity | Neutral Salt Spray (8 hrs & 24 hrs) | After 500 hrs @ 600° C. (5 heat cycles) | After 2 hrs @ 350° C. | After 500 hrs @ 600° C. |
| Excellent | Excellent | Excellent | Excellent (no peeling) | 96.1-96.4 | 95.5-96.2 |

Example 5

The paint formulation was prepared using the components listed in Table 9, the components being added to the paint formulation in the order listed in the table. In contrast to the prior examples, the paint formulation of Example 5 is applied to T-91 alloy steel.

The formulations in Example 5 were prepared using a similar methodology as noted above for Example 4. However, the paint formulation was applied in three layers on T-91 alloy steel plates (having a size of 60 mm×60 mm) which had been grit-blasted prior to paint application. Each paint formulation layer was applied to the plate using a spray coating technique to a wet thickness of approximately 50-60 μm. Each paint layer was applied and cured before application of the subsequent paint layer. Thus, each paint layer was cured separately. Each paint layer was cured using a drying/curing profile of drying in an oven at 70° C. for 2 hours, heating in an oven from 70° C. to 250° C. at 2° C./min, dwelling at 250° C. for 1 hour, heating from 250° C. to 350° C. at 2° C. per minute, dwelling at 350° C. for 2 hours, and heating from 350° C. to 500° C. at 2° C. per minute. The painted plates were then allowed to cool to room temperature, for example, in the oven with the door ajar. The final dry film thickness was between 80 μm and 100 μm.

Each plate having the paint formulation thereon was subjected to a number of the durability/reliability tests described above, including an adhesion test, a humidity test, a solar absorptivity test, and a heat resistance test. The results for the paint formulations incorporating the glass additive are summarized in Table 10. The paint formulations demonstrated excellent adhesion, corrosion resistance, and neutral salt spray performance. The absorptivity of the paint formulation after curing was greater than 95%. After heat resistance testing (i.e., ten heating cycles of 100 hours at 620-650° C. per cycle), the paint formulation showed no degradation or peeling and had final absorptivity also greater than 95%.

TABLE 9

Paint formulation for use on T-91 Steel Alloy.

| Component | Type | Amount (% wt/wt) |
|---|---|---|
| Organic Solvent | m-Xylene | 22.63 |
| Dispersing Agent | DISPERBYK ®-180 | 0.76 |
| Wetting Agent | BYK ®-333 | 0.51 |
| Dispersing Agent | ANTI-TERRA ®-204 | 0.08 |
| Organic Binder | SILRES ® REN 60 | 53.72 |
| Black Pigment | Black-444 | 8.72 |
| Inorganic Filler | PLASTORIT ® 0000 | 9.56 |
| Glass Additive | Sodium borate | 3.82 |

TABLE 10

Results of paint formulation from Table 9 applied to T-91 Steel Alloy.

| Test | Passage Criteria | Result |
|---|---|---|
| Soak Time | 1000 hours | Pass |
| Absorptivity | Less than 1% loss Overall greater than 95% | Pass |
| Coating Degradation/Damage | No loss of adhesion No severe mud cracking or change in uniformity | Pass |
| Visual Examination | No spallation | Pass |

Example 6

The paint formulation was prepared using the same formulation and methodology as Example 3, but the paint formulation was applied such that the dry film thickness was in the range from 200 μm to 300 μm. The painted samples exhibited properties and results similar to those achieved for Example 3. In particular, the paint formulation had a final absorptivity after heat resistance testing (i.e., ten heating cycles of 100 hours at 600° C. per cycle) of 95-96% without peeling.

Example 7

The paint formulation was prepared using the same formulation and methodology as Example 3, but the organic solvent of Example 3 was replaced with a 1:1 mixture of xylene and DOWANOL® DPM. Such a mixture may serve to reduce the solvent evaporation rate and thereby improve coating performance. The painted samples exhibited properties and results similar to those achieved for Example 3.

Example 8

The paint formulation was prepared using the same formulation and methodology as Example 3, but the BYK®-410 thickening agent of Example 3 was omitted. The painted samples exhibited properties and results similar to those achieved for Example 3.

Example 9

Various permutations of the examples above with additional coating layers and surface treatments were performed to ascertain the effect of the layers/treatments on performance of the paint formulation. As described above, such layers/treatments include: (1) surface treatment (e.g., grit blasting); (2) corrosion protection (e.g., forming a black oxidation layer, forming a sol-gel sealing layer); and (3) anti-reflection (e.g., forming an anti-reflection coating). The paint formulation can be disposed between the corrosion protection layer and the anti-reflection layer. Moreover, the paint formulation can be one of the formulations noted above with respect to Examples 3, 4, or 6. Test results for such examples may be similar to those achieved for Example 3.

Comparative Example 1

Commercially available solar paint Pyromark®-2500 was applied in two layers to each of five carbon steel plates (having a size of 60 mm×60 mm), which had been grit-blasted prior to paint application. Each paint layer was applied to the plate using a hand roller coating technique to a wet thickness of approximately 100 μm. Each paint layer was applied and cured before application of the subsequent paint layer. Thus, each paint layer was cured separately. Each paint layer was cured using a drying/curing profile of drying at room temperature (e.g., 25° C.) for 24 hours, heating in an oven from 25° C. to 250° C. at 2° C./min, dwelling at 250° C. for 1 hour, heating from 250° C. to 350° C. at 2° C. per minute, and dwelling at 350° C. for 2 hours. The painted plates were then allowed to cool to room temperature, for example, in the oven with the door ajar. The final dry film thickness was in the range of 50 μm to 60 μm.

Each plate of Comparative Example 1 was subjected to a number of the durability/reliability tests described above, including an adhesion test, a humidity test, a solar absorptivity test, and a heat resistance test. The results are summarized in Table 11. The Comparative Example 1 demonstrated excellent adhesion, but the coating failed the humidity test. Moreover, the film absorptivity after curing (i.e., after 2 hours @ 350° C.) was 96-96.5%, but after 100 hours at 600° C. the absorptivity decreased dramatically to 85-90%. The paint of the Comparative Example 1 was therefore unacceptable for use in a solar thermal system.

TABLE 11

Results of comparative example 1 paint formulation.

| Tests | | | Coating Absorptivity (% SCI) | |
|---|---|---|---|---|
| Adhesion | Humidity | Neutral Salt Spray (8 hrs & 24 hrs) | After 2 hrs @ 350° C. | After 100 hrs @ 600° C. |
| Excellent | Failed | N/A | 96-96.5 | 85-90 |

Comparative Example 2

Comparative Example 2 was prepared using the same formulation and methodology as Comparative Example 1, but PLASTORIT® 0000 has been added to the Pyromark®-2500. Each plate of Comparative Example 2 was subjected to a number of the durability/reliability tests described above, including an adhesion test, a humidity test, a solar absorptivity test, and a heat resistance test. The results are summarized in Table 12. The Comparative Example 2 also demonstrated excellent adhesion, but the coating failed the humidity test. Moreover, the film absorptivity after curing (i.e., after 2 hours @ 350° C.) was 96-96.5%, but after 100 hours at 600° C. the absorptivity decreased to 93-95%. The paint of the Comparative Example 2 was therefore also unacceptable for use in a solar thermal system.

TABLE 12

Results of comparative example 2 paint formulation.

| Tests | | | Coating Absorptivity (% SCI) | |
|---|---|---|---|---|
| Adhesion | Humidity | Salt Spray (8 hrs & 24 hrs) | After 2 hrs @ 350° C. | After 100 hrs @ 600° C. |
| Excellent | Failed after 24 hours | N/A | 96-96.5 | 93-95 |

Although the steps of a process for painting a surface have been described and illustrated together, it is of course contemplated that one or more steps can be performed separately or together, at the same time or at different times, at the same location or at different locations, and/or in the illustrated order or out of order. Additionally, it is contemplated that one or more steps can be optionally omitted. For example, as noted above, the formation of the passivation layer, the corrosion protection layer, and/or the anti-reflection coating may be omitted. In another example, a single layer of paint formulation may be applied to the metal article without any additional layers or treatments. In still another example, multiple layers of the paint formulation may be provided on top of each other.

In embodiments, an article of manufacture can include a heat transfer member having a receiving surface, which has an absorptivity of at least 70% with respect to light of a wavelength in the range from 250 nm to 3000 nm that is maintainable at temperatures of 600° C. for at least 1000 hours. The article can include a solar receiver and/or the heat transfer member can be part of a solar receiver. The heat transfer member can include a surface coating, e.g., a paint on the heat transfer member that defines properties of the receiving surface thereof.

Although particular formulations have been discussed herein, other formulations can also be employed. Furthermore, the foregoing descriptions apply, in some cases, to examples generated in a laboratory, but these examples can be extended to production techniques. For example, where quantities and techniques apply to the laboratory examples, they should not be understood as limiting. In addition, although certain materials, chemicals, or components have been described herein, other materials, chemicals (elemental or compositions), or components are also possible according to one or more contemplated embodiments.

Features of the disclosed embodiments may be combined, rearranged, omitted, etc., within the scope of the present disclosure to produce additional embodiments. Furthermore, certain features may sometimes be used to advantage without a corresponding use of other features.

It is, thus, apparent that there is provided, in accordance with the present disclosure, solar-radiation-absorbing formulations and related apparatus and methods. Many alternatives, modifications, and variations are enabled by the present disclosure. While specific embodiments have been shown and described in detail to illustrate the application of the principles of the invention, it will be understood that the invention may be embodied otherwise without departing from such principles. Accordingly, Applicants intend to embrace all such alternatives, modifications, equivalents, and variations that are within the spirit and scope of the present invention.

The invention claimed is:

1. A paint formulation comprising:
   a) an oxide-based pigment at a concentration between 5% (wt/wt) and 30% (wt/wt), the pigment includes at least one selected from the group consisting of a manganese ferrite black spinel, a chromium cobalt iron black spinel, a copper chromite black spinel, and a nickel iron chromite black spinel;
   b) an organic binder at a concentration between 10% (wt/wt) and 80% (wt/wt), the binder includes at least one component selected from the group consisting of a methyl polysiloxane, a phenyl polysiloxane, a phenylmethyl silicone resin, and an emulsion of a phenylmethyl polysiloxane resin;
   c) a boron-based glass additive in the form of particles having a size between 80 µm and 140 µm, and at a concentration between 1% (wt/wt) and 20% (wt/wt), the additive includes at least one component selected from the group consisting of boric acid, boron oxide, metal borides, and boron salts;
   d) an inorganic filler in the form of particles having a size less than 30 µm, and including at least one component selected from the group consisting of mica, talc, and clay; and
   e) an organic solvent at a concentration between 10% (wt/wt) and 60% (wt/wt), the solvent including at least one component selected from the group consisting of a glycol ether, an aromatic naphtha solvent, butyl acetate, toluene, and a member of the xylene family,
   wherein said oxide-based pigment and/or the paint formulation have an absorptivity of at least 70% with respect to light having a wavelength in the range from 250 nm to 3000 nm.

2. The paint formulation of claim 1, wherein the oxide-based pigment and/or the paint formulation has an absorptivity of at least 95% with respect to light having a wavelength in the range from 250 nm to 3000 nm.

3. The paint formulation of claim 1, wherein the organic binder is phenylmethyl polysiloxane resin.

4. The paint formulation of claim 1, wherein the glass additive is one of sodium borate, disodium tetraborate, and potassium tetraborate.

5. The paint formulation of claim 1, wherein the organic solvent is a member of the xylene family.

6. A method of painting a metal surface comprising:
   1) electrostatic-spraying a paint formulation over the metal surface, the paint formulation comprising:
   a) an oxide-based pigment at a concentration between 5% (wt/wt) and 30% (wt/wt), the pigment comprising at least one component selected from the group consisting of a manganese ferrite black spinel, a chromium cobalt iron black spinel, a copper chromite black spinel, and a nickel iron chromite black spinel;
   b) an organic binder at a concentration between 10% (wt/wt) and 80% (wt/wt), the binder comprising at least one component selected from the group consisting of a methyl polysiloxane, a phenyl polysiloxane, a phenylmethyl silicone resin, and an emulsion of a phenylmethyl polysiloxane resin;

c) a boron-based glass additive at a concentration between 1% (wt/wt) and 20% (wt/wt), the additive comprising at least one component selected from the group consisting of boric acid, boron oxide, metal borides, and boron salts;

d) an inorganic filler comprising at least one component selected from the group consisting of mica, talc, and clay; and e) an organic solvent at a concentration between 10% (wt/wt) and 60% (wt/wt), the solvent comprising at least one component selected from the group consisting of a glycol ether, an aromatic naphtha solvent, butyl acetate, toluene, and a member of the xylene family; and 2) after the applying, curing the paint formulation at a temperature greater than 200° C., such that the organic binder irreversibly converts to an inorganic binder, wherein, after the curing, the oxide-based pigment and/or the paint formulation has an absorptivity of at least 70% with respect to light having a wavelength in the range of from 250 nm to 3000 nm.

7. The method of claim 6, wherein, the oxide-based pigment and/or the paint formulation has an absorptivity of at least 95% with respect to light having a wavelength in the range from 250 nm to 3000 nm.

8. The method of claim 6, wherein:
the organic binder is phenylmethyl polysiloxane resin,
the glass additive is one of sodium borate, disodium tetraborate, and potassium tetraborate, and
the organic solvent is a member of the xylene family.

9. The method of claim 6, further comprising:
prior to the spraying, grit-blasting the metal surface;
forming a passivation layer over the metal surface; and
forming a corrosion protection coating over the metal surface.

10. The method of claim 6, further comprising forming an anti-reflective coating over the metal surface.

11. The paint formulation of claim 1, wherein the pigment is a manganese ferrite black spinel at a concentration between 5% (wt/wt) and 12% (wt/wt).

12. The paint formulation of claim 11, wherein the organic binder is a phenyl methyl polysiloxane resin.

13. The paint formulation of claim 1, wherein the pigment is a Black 26 pigment at a concentration between 5% (wt/wt) and 12% (wt/wt).

14. The paint formulation of claim 13, wherein the organic binder is a phenyl methyl polysiloxane resin.

15. The method of claim 6, wherein the pigment is a manganese ferrite black spinel at a concentration between 5% (wt/wt) and 12% (wt/wt).

16. The method of claim 15, wherein the organic binder is a phenyl methyl polysiloxane resin.

17. The method of claim 6, wherein the pigment is a Black 26 pigment at a concentration between 5% (wt/wt) and 12% (wt/wt).

18. The method of claim 17, wherein the organic binder is a phenyl methyl polysiloxane resin.

* * * * *